United States Patent
Otsuka

(10) Patent No.: US 9,595,698 B2
(45) Date of Patent: Mar. 14, 2017

(54) BATTERY

(71) Applicant: MURATA MANUFACTURING CO., LTD., Kyoto-Fu (JP)

(72) Inventor: Daisuke Otsuka, Nagaokakyo (JP)

(73) Assignee: MURATA MANUFACTURING CO., LTD., Nagaokakyo-shi, Kyoto-fu (JP)

( * ) Notice: Subject to any disclaimer, the term of this patent is extended or adjusted under 35 U.S.C. 154(b) by 254 days.

(21) Appl. No.: 14/134,507

(22) Filed: Dec. 19, 2013

(65) Prior Publication Data

US 2014/0106201 A1   Apr. 17, 2014

Related U.S. Application Data

(63) Continuation of application No. PCT/JP2012/065380, filed on Jun. 15, 2012.

(30) Foreign Application Priority Data

Jun. 21, 2011 (JP) ................................ 2011-137124

(51) Int. Cl.
*H01M 2/02* (2006.01)
*H01M 2/10* (2006.01)
*H01M 10/052* (2010.01)

(52) U.S. Cl.
CPC ......... *H01M 2/0212* (2013.01); *H01M 2/024* (2013.01); *H01M 2/0275* (2013.01); *H01M 2/0287* (2013.01); *H01M 2/1061* (2013.01); *H01M 2/1077* (2013.01); *H01M 2/1083* (2013.01); *H01M 10/052* (2013.01); *H01M 2220/20* (2013.01); *H01M 2220/30* (2013.01); *Y02T 10/7011* (2013.01)

(58) Field of Classification Search
CPC .. H01M 2/0212; H01M 2/024; H01M 2/1061; H01M 2/1077; H01M 2/00; H01M 2/0207; H01M 2/0217; H01M 2/0237; H01M 2/10; H01M 2/0287
See application file for complete search history.

(56) References Cited

U.S. PATENT DOCUMENTS

| | | | |
|---|---|---|---|
| 2004/0166406 A1 | 8/2004 | Higuchi et al. | |
| 2006/0286450 A1* | 12/2006 | Yoon et al. | 429/180 |
| 2007/0026318 A1* | 2/2007 | Kishi et al. | 429/341 |
| 2009/0200509 A1* | 8/2009 | Suzuki et al. | 252/182.1 |
| 2009/0211082 A1* | 8/2009 | Yoon et al. | 29/623.1 |
| 2011/0318623 A1* | 12/2011 | Lee et al. | 429/100 |
| 2012/0115011 A1* | 5/2012 | Kim | 429/156 |

FOREIGN PATENT DOCUMENTS

| | | | |
|---|---|---|---|
| JP | 2003-068257 A | | 3/2003 |
| JP | 2004-006226 | | 1/2004 |
| JP | 2005-268029 A | | 9/2005 |
| JP | 2005-302501 A | | 10/2005 |
| JP | 2008-103239 A | | 5/2008 |
| JP | 2010-067422 A | | 3/2010 |
| WO | WO 2010/050697 | * | 5/2010 |

OTHER PUBLICATIONS

Machine translation of JP 2003-068257, published on Mar. 7, 2003.*
PCT/JP2012/065380 ISR dated Aug. 21, 2012.
PCT/JP2012/065380 Written Opinion dated Aug. 21, 2012.

* cited by examiner

*Primary Examiner* — Anca Eoff
(74) *Attorney, Agent, or Firm* — Arent Fox LLP

(57) ABSTRACT

A battery including a supporting member that functions as a fixing part or a gripping part. The supporting member includes fixing parts for fixing a battery to another battery, and a body-holding part for holding and fixing a region of an exterior body with a battery element housed therein.

7 Claims, 9 Drawing Sheets

Fig. 9 – PRIOR ART
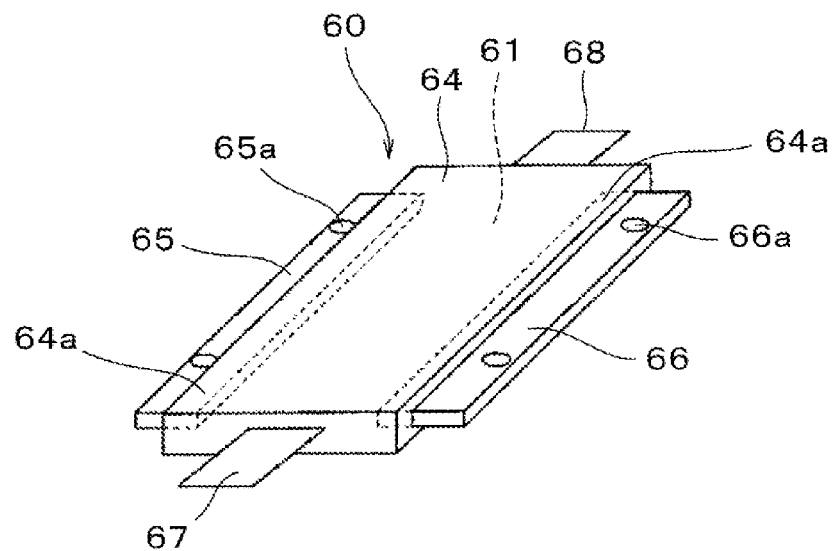
Fig. 10 – PRIOR ART
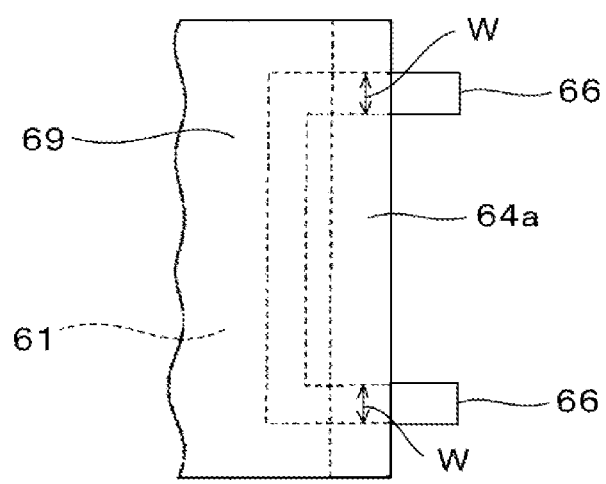

Fig. 11 – PRIOR ART
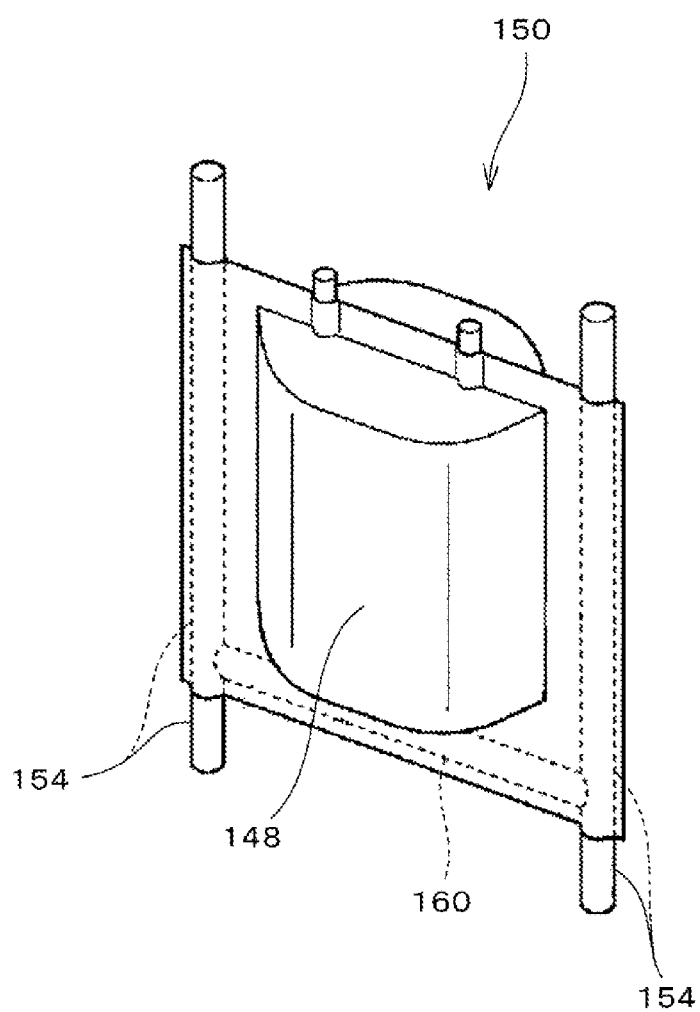

US 9,595,698 B2

BATTERY

CROSS REFERENCE TO RELATED APPLICATIONS

The present application is a continuation of International application No. PCT/JP2012/065380, filed Jun. 15, 2012, which claims priority to Japanese Patent Application No. 2011-137124, filed Jun. 21, 2011, the entire contents of each of which are incorporated herein by reference.

FIELD OF THE INVENTION

This invention relates to a battery structured to have a battery element including a laminated body obtained by stacking a positive electrode member and a negative electrode member to be opposed to each other with a separator interposed therebetween, and an electrolyte solution, have the battery element housed in an exterior body, and have a positive electrode lead terminal and a negative electrode lead terminal extracted outward, more particularly, a battery including a supporting member for fixing the battery onto other member.

BACKGROUND OF THE INVENTION

In recent years, secondary batteries typified by lithium ion secondary batteries have been widely used as power sources for mobile electronic devices such as cellular phones and mobile personal computers. In addition, electric vehicles and hybrid vehicles have developed and put into practical use, and demands for secondary batteries such as lithium ion secondary batteries have been increasing as large-size applications.

Now, as this secondary battery (hereinafter, also simply referred to as a "battery"), a battery has been widely used which is structured to have a laminated body of multiple positive electrode members and negative electrode members stacked with separators interposed therebetween, and an electrolyte solution housed in an exterior body (housing), and have a positive electrode lead terminal and a negative electrode lead terminal extracted outward from the exterior body.

As one of such batteries, a battery is known which includes a supporting member for fixing the battery on other member. It is to be noted that when the battery is fixed on other member, the supporting member is required besides the positive electrode lead terminal and the negative electrode lead terminal, because in the case of holding the battery with the use of the positive and negative electrode lead terminals, the junctions between the positive electrode lead terminal and negative electrode lead terminal, and current collectors (current-collecting foil) for connecting the positive electrode members and negative electrode members constituting the battery element are likely to be broken when external stress is applied such as vibrations.

Further, such a battery (unit battery) 60 as shown in FIG. 9 has been proposed as a battery including the supporting member (see Patent Document 1).

This battery 60 includes an exterior body 64 composed of a pair of upper and lower laminate sheets on both sides for housing a battery element 61, fixing-point forming members 65, 66 with fixing points 65a, 66a formed for use in fixing the battery 60 onto other member, and thermally welded sections 64a of peripheral sections of the pair of laminate sheets, which are thermally welded while the fixing-point forming members 65, 66 are partially placed so as to be interposed between the laminate sheets at least partially at the peripheries of the upper and lower laminate sheets on both sides. Further, a positive electrode lead terminal 67 and a negative electrode lead terminal 68 are extracted outward from sides of the exterior body 64 without the fixing-point forming members 65, 66 held.

In addition, Patent Document 1 also proposes a structure which has a fixing-point forming member 66 extracted outward through a thermally welded section 64a from a housing space 69 inside an exterior body 64 with a battery element 61 housed therein as shown in FIG. 10.

The thus configured battery (unit battery) in Patent Document 1 makes it possible to easily fix and position the battery, thereby improving workability.

Furthermore, Patent Document 2 proposes, as a battery including a supporting member, a battery (unit battery) structured to have a reinforcing core material 160 provided between a pair of core materials 154 for improving the fixing strength of a laminate case battery 150 to a unit case and improving the shape maintenance strength of a individual battery 148, as shown in FIG. 11.

However, in the case of the battery in Patent Document 1, the fixing-point forming members 65, 66 are partially placed in the housing space 69 of the battery element 61, with the battery element, in particular, the electrolyte solution in contact with the fixing-point forming members 65, 66, and there is thus a possibility that deterioration of the electrolyte solution will be accelerated. In addition, there is a possibility that the exterior body 64 will become badly sealed to cause ingress of water into the battery, and cause battery characteristics to be degraded.

In addition, in the case of the configuration in Patent Document 2, the U-shaped structure is formed from the core materials 154 and the reinforcing core material 160, and the fixing strength and the shape maintenance strength of the individual battery 148 are thus expected to be improved to some extent. However, in the case of the configuration in Patent Document 2, the U-shaped structure and the individual battery 148 are spaced at regular intervals, and the individual battery 148 is thus movable to a certain extent in the thickness direction. More specifically, when external stress is applied such as vibrations, the individual battery 148 is moved in the thickness direction, thus resulting in the problem of failing to suppress the load applied on the junctions between the positive electrode lead terminal and negative electrode lead terminal, and current collectors (current-collecting foil) for connecting the positive electrode members and negative electrode members constituting the battery element. In order to suppress the movement of the individual battery 148 in the thickness direction, it is conceivable to reduce the distance between the U-shaped structure and the individual battery 148, while the same problem as in the case of Patent Document 1 mentioned above is caused when the U-shaped structure reaches the housing space for the battery element. Therefore, there is a need to ensure the interval between the U-shaped structure and the individual battery 148 to some extent in consideration of battery characteristics and sealing properties, and there is thus a problem that the laminate case battery 150 itself undergoes an increase in size.

Patent Document 1: JP 2010-67422 A
Patent Document 2: JP 2003-68257 A

SUMMARY OF THE INVENTION

The present invention is intended to solve the problems mentioned above, and an object of the invention is to provide a highly reliable battery including a supporting member which functions as a fixing part or a gripping part, for example, when multiple batteries (unit batteries) are combined to assemble a cell, where the supporting member has no possibility of causing battery characteristics to be degraded, and has high fixing strength and shape maintenance strength.

In order to solve the problems mentioned above, a battery according to the present invention is a battery structured so that a battery element including a laminated body with a positive electrode member and a negative electrode member stacked to be opposed to each other with a separator interposed therebetween, and an electrolyte is housed in an exterior body formed by providing a laminate sheet obtained by integrally stacking an outer protective layer composed of a resin, an intermediate gas barrier layer composed of a metal, and an inner adhesive layer composed of a resin so that the adhesive layer is opposed to one another, and thermally welding the laminate sheet, and a positive electrode lead terminal electrically connected to the positive electrode member and a negative electrode lead terminal electrically connected to the negative electrode member are extracted outward from the exterior body, and the battery is characterized in that it has a supporting member including a fixing part for fixing the battery to other member, and a body-holding part for holding and fixing a region of the exterior body with the battery element housed, and the region is held and fixed with the body-holding part in contact with the protective layer of the laminate sheet constituting the exterior body at a peripheral section in the region of the exterior body.

In addition, in the battery according to the present invention, at least the fixing part is preferably configured to project outward from the projection range of the exterior body in the case.

In addition, the body-holding part of the supporting member is preferably bonded to a peripheral section of the exterior body with the adhesive layer of the laminate sheet constituting the exterior body.

In addition, in the battery according to the present invention, preferably, the exterior body is composed of a pair of laminate sheets, one of the pair of laminate sheets is formed to be larger than the other laminate sheet, a protruded part of the laminate sheet, which protrudes from an opposed region of the both sheets when the both sheets are opposed, is folded back so that the adhesive layer is located on the inside of the folded part, and the adhesive layer of the folded part is bonded to the body-holding part of the supporting member to hold and fix the supporting member on the exterior body.

In addition, preferably, the exterior body is rectangular in planar shape, and the body-holding part of the supporting member is bonded to a peripheral section of the exterior body with the adhesive layer of the laminate sheet folded back, on a side without the positive electrode lead terminal or the negative electrode lead terminal extracted therefrom.

In addition, the supporting member is preferably formed from a resin material or a metal material.

Furthermore, an assembled battery according to the present invention includes more than one battery according to the present invention, and is characterized in that fixing parts of supporting members for each of the batteries are linked to integrate the batteries.

The battery according to the present invention is configured to have the supporting member including the fixing part for fixing the battery to other member, and the body-holding part, and configured so that the region is held and fixed with the body-holding part of the supporting member in contact with the protective layer of the laminate sheet constituting the exterior body at a peripheral section in the region of the exterior body with the battery element housed. Thus, the movement of the region can be limited in the thickness direction. Therefore, when external stress is applied such as vibrations, the load can be suppressed which is applied on the junctions between the positive electrode lead terminal and negative electrode lead terminal, and current collectors (current-collecting foil) for connecting the positive electrode members and negative electrode members constituting the battery element. In addition, the supporting member makes it possible to achieve a highly reliable battery which can ensure high fixing strength and shape maintenance strength.

In addition, when the fixing part is adapted to project outward from the projection range of the exterior body in the case, it becomes possible to easily and reliably fix the battery onto other member with the use of the fixing part projecting from the projection range of the exterior body, the battery element can be fixed on other member in a stable state, and the present invention can be thus made more effective.

In addition, when the body-holding part of the supporting member is bonded to a peripheral section of the exterior body with the adhesive layer of the laminate sheet constituting the exterior body, it becomes possible to achieve a highly reliable battery with the supporting member reliably held and fixed on the exterior body, without separately requiring any adhesive.

In addition, when the exterior body is composed of a pair of laminate sheets, one of the laminate sheets is formed to be larger than the other laminate sheet, the protruded part of the laminate sheet, which is obtained when the both sheets are opposed, is folded back so that the adhesive layer is located on the inside of the folded part, and the adhesive layer of the folded part is bonded to the body-holding part of the supporting member, it becomes possible to achieve a highly reliable battery with the supporting member reliably held and fixed on the exterior body, without separately requiring any adhesive, and while suppressing the increase in exterior body size. In addition, it becomes possible to reduce the exterior body formed by one and the other laminate sheets in planar shape and planar area, down to the planar shape and planar area of an exterior body formed in the absence of the protruded part, and the present invention can be made more effective.

In addition, when the exterior body is rectangular in planar shape, the body-holding part of the supporting member is bonded with the adhesive layer of the laminate sheet folded back as described above, on a side without the positive electrode lead terminal or the negative electrode lead terminal extracted therefrom, thereby making it possible to achieve a highly reliable battery structured to have the body-holding part of the supporting member held and fixed on a peripheral section of the exterior body, while ensuring the sealing reliability of the exterior body.

In addition, in the present invention, the use of the supporting member formed from a resin material or a metal material makes it possible to achieve a highly reliable battery with the supporting member reliably held and fixed on the exterior body, and the supporting member capable of being expected to have high fixing strength and shape maintenance strength.

In addition, for the assembled battery according to the present invention, the fixing parts of the supporting members for each of the batteries are linked to integrate the batteries, and the batteries can be thus treated as one assembled battery, thereby improving the handling ability.

BRIEF EXPLANATION OF THE DRAWINGS

FIG. 9 is a perspective view illustrating a conventional battery.

FIG. 10 is a plan view illustrating a main section of another conventional battery.

FIG. 11 is a perspective view illustrating yet another conventional battery.

DETAILED DESCRIPTION OF THE INVENTION

Features of the present invention will be described in more detail with reference to examples of the present invention below.

Example 1

Figure 1:
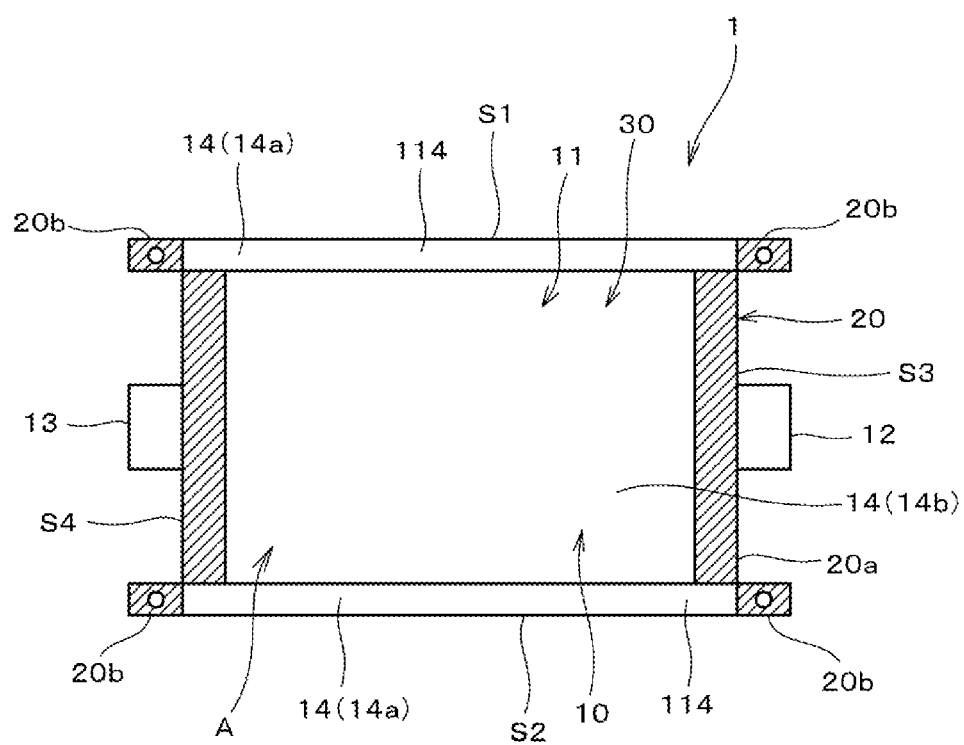
FIG. 1 is a plan view illustrating a battery according to an example (Example 1) of the present invention.
Figure 2:
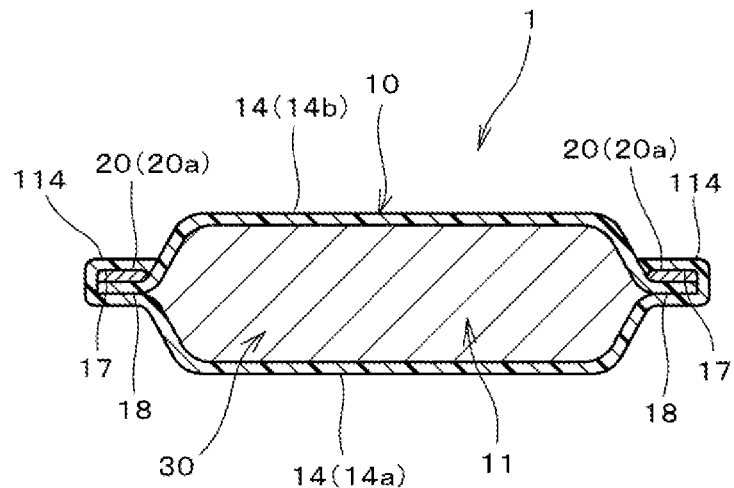
FIG. 2 is a sectional side view of the battery according to Example 1 of the present invention.

FIG. 1 is a plan view illustrating a battery (lithium ion secondary battery) (unit battery) according to an example of the present invention, and FIG. 2 is a sectional side view illustrating a main section in section.

The battery (lithium ion secondary battery) (unit battery) 1 according to this example includes a battery element 11 including a laminated body with a positive electrode member and a negative electrode member stacked to be opposed to each other with a separator interposed therebetween and an electrolyte solution, a positive electrode lead terminal 12 and a negative electrode lead terminal 13 electrically connected respectively to the positive electrode member and negative electrode member (not particularly shown) of the battery element 11, and an exterior body 10 for housing the battery element 11, which is substantially rectangular in planar shape, and the positive electrode lead terminal 12 and the negative electrode lead terminal 13 are extracted from two sides of the exterior body 10 which are opposed to each other.

Figure 3:
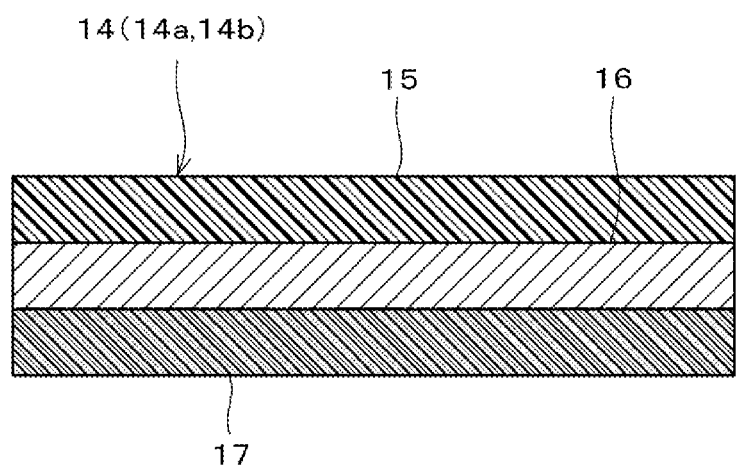
FIG. 3 is a diagram illustrating the configuration of a laminate sheet constituting an exterior body of the battery according to Example 1 of the present invention.

The exterior body 10 is, as shown in FIG. 3, formed with the use of a pair of laminate sheets 14 (14a, 14b) obtained by integrally stacking an outer protective layer 15 of a resin (a polyamide resin in this example), an intermediate gas barrier layer 16 of a metal (aluminum in this example), and an inner adhesive layer 17 of a resin (a polypropylene resin in this example). More specifically, the exterior body 10 is formed by providing the pair of laminate sheets 14 (14a, 14b) so that the adhesive layers 17 are opposed to each other, and then applying thermal welding to peripheral sections of the pair of laminate sheets 14 (14a, 14b). It is to be noted that in this example, laminate sheets subjected to a wringing process are used as the laminate sheets 14 (14a, 14b) in order to form a housing space 30 (FIG. 2) for housing the battery element 11. However, it is also possible to use laminate sheets with, in particular, concave sections subjected to no wringing process, for example, when the battery element is small in thickness.

The peripheral section (thermally welded section) 18 of the laminate sheets 14 (14a, 14b) with the adhesive layers 17 thermally welded with each other has a high adhesive strength, which is not decreased even in the case of leaving the sheets for a long period of time under high temperature and humidity (for example, 60° C. and 90% RH, 3000 hours), thus achieving high bonding reliability.

It is to be noted that the laminate sheets 14 (14a, 14b) are not to be considered limited to the configuration mentioned above, and the adhesive layers 17 may be, for example, a mixed material of polypropylene and polyethylene.

Further, this battery 1 includes a supporting member 20 which functions as a fixing part or a gripping part, for example, when multiple batteries (unit batteries) are combined to form an assembled battery. More specifically, this supporting member 20 has a body-holding part 20a that has a frame-like structure, and a fixing part 20b for fixing the battery 1 to another member. In addition, as shown in FIG. 2, the body-holding part 20a has an inner periphery in contact with the protective layer 15 (see FIG. 3) of the laminate sheet 14 (14b) constituting the exterior body 10 in a peripheral section of a region A with the battery element 11 housed therein in the exterior body 10, and in this condition, the region A is held and fixed by the supporting member 20.

Figure 4:
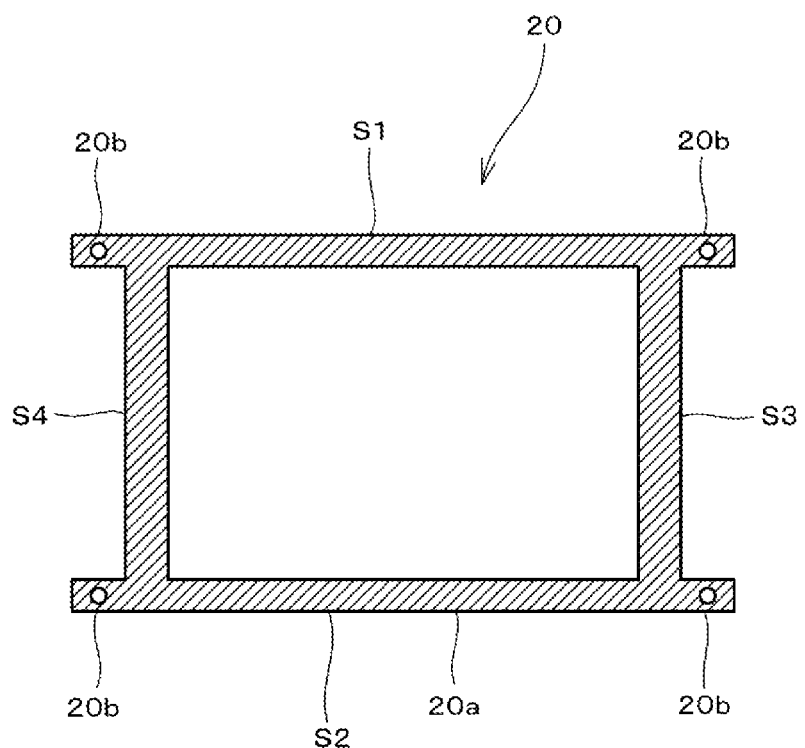
FIG. 4 is a plan view illustrating the configuration of a supporting member for use in the battery according to Example 1 of the present invention.

As shown in FIG. 4, the body-holding part 20a of the supporting member 20 has a rectangular frame-like structure including four sides in total: two sides S1, S2 opposed to each other and sides S3, S4 opposed to each other. It is to be noted that the body-holding part 20a is adapted to have a frame-like structure including four sides in the present example, but not to be considered limited to this structure, and various shapes are available such as circular shapes and U shapes, and combinations of L shapes and rod shapes. In short, what is required is that the body-holding part in contact with the surface of (the laminate sheet constituting) the exterior body in the region with the battery element housed therein can limit the movement of the region with the battery element housed therein. However, the highest fixing strength and shape maintenance strength are achieved when a closed shape such as a frame-like or circular shape has an inner periphery in contact with the surface of (the laminate sheet constituting) the exterior body in the region A (FIG. 1) with the battery element 11 housed therein, and this shape is preferably adopted.

In addition, the fixing part 20b is configured to project outward from the projection range of the exterior body 10 in the case of a planar view so that fixing work, etc. can be easily carried out.

The supporting member 20 is, as shown in FIGS. 2 and 4, held and fixed on the peripheral section (thermally welded section) 18 of the exterior body 10 in such a way that protruded parts 114 of the laminate sheet 14*a* formed to be larger than the other laminate sheet 14*b* from the region opposed to the other laminate sheet 14*b* are folded back to bond the adhesive layer 17 (FIG. 3) to the pair of sides S1, S2 opposed to each other for constituting the body-holding part 20*a*. It is to be noted that direct bonding to the outer surface of the peripheral section (thermally welded section) 18 of the exterior body 10 may be adopted without providing this protruded part 114.

In addition, the sides S1 to S4 of the supporting member 20 hold and fix the region A with their inner peripheries in contact with the exterior body for the region A with the battery element 11 housed therein, and function to limit the movement of the battery element, and maintain the shape of the battery element.

Furthermore, the battery 1 according to this example is structured such that the opposed sides S1, S2 constituting the body-holding part 20*a* are strongly bonded and held by the adhesive layer 17 of the laminate sheet 14*a*, and fixing parts 20*b* at both ends of the sides S1, S2 project outward from the exterior body 10.

In this example, the supporting member formed from a polypropylene resin is used as the supporting member 20, thus strongly bonded to the adhesive layer 17 (FIG. 3) of the laminate sheet 14, which is composed of a polypropylene resin, and thus reliably held by the exterior body. However, the supporting member 20 is not limited to the supporting member composed of a polypropylene resin, and it is possible to use various materials which have properties (rigidity, mechanical strength, etc.) expected as the supporting member 20, such as other resins, e.g. polyethylene, metals, e.g. aluminum or composite materials of resins and metals.

It is to be noted that the supporting member is desirably selected in consideration of the material constituting the adhesive layers of the laminate sheets, required rigidity, mechanical strength, etc.

Next, a method for manufacturing the battery 1 according to this example will be described with reference to FIGS. 1 to 6.

First, prepared are a laminated body with a positive electrode member and a negative electrode member stacked to be opposed to each other with a separator interposed therebetween, and an electrolyte solution. In addition, the laminate sheets 14 (14*a*, 14*b*) are prepared which are intended to form the exterior body 10 for housing the battery element 11 including the laminated body and the electrolyte solution. Furthermore, the supporting member 20 is prepared which has a frame-like structure as shown in FIG. 4, and includes the body-holding part 20*a* and the fixing parts 20*b* projected from corners of the body-holding part 20*a*.

Figure 5:
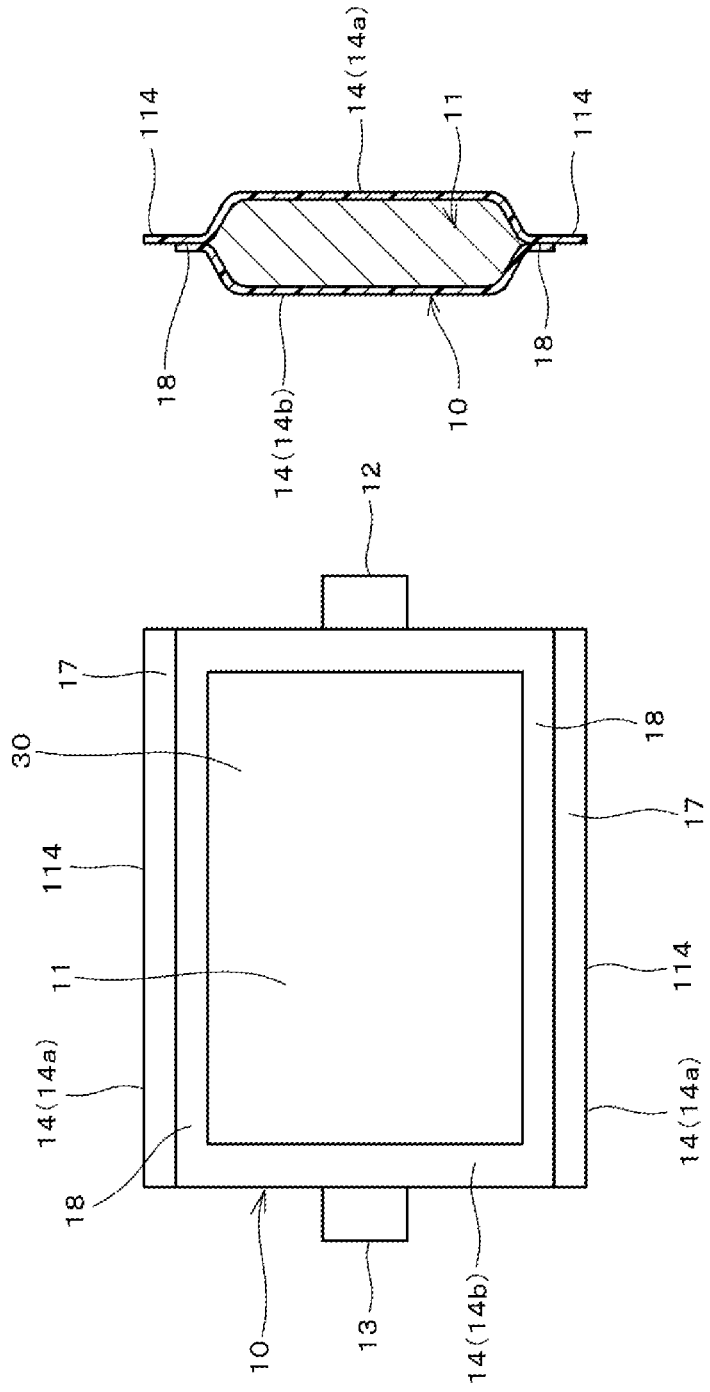
FIGS. 5(a) and 5(b) are diagrams illustrating a step of a method for manufacturing a battery according to Example 1 of the present invention, which are respectively a plan view and a sectional side view each illustrating a battery element sealed in an exterior body.

Then, in this case, as shown in FIGS. 5(*a*) and 5(*b*), as for the pair of laminate sheets 14 (14*a*, 14*b*), the laminate sheet 14*a* is formed to be larger than the other laminate sheet 14*b*, in such a way that ends of the laminate sheet 14*a* opposed to each other are protruded to form a pair of protruded parts (extra parts) 114 when the both sheets are opposed.

Then, as shown in FIGS. 5(*a*) and 5(*b*), the prepared laminated body, the pair of laminate sheets 14 (14*a*, 14*b*), etc. are arranged in a predetermined form to be located in a housing space 30 formed by the pair of laminate sheets 14 (14*a*, 14*b*), the peripheral sections (four sides) of the laminate sheets 14 (14*a*, 14*b*) are thermally welded while being partially left unwelded, an appropriate amount of the electrolyte solution is then injected into the exterior body 10 from the unwelded section of the peripheral section of the exterior body 10, and the exterior body 10 is hermetically sealed by completely welding the peripheral section of the exterior body 10 while carrying out vacuum suction, thereby obtaining a structure with the battery element 11 sealed in the internal space of the exterior body 10.

In this case, the positive electrode lead terminal 12 and the negative electrode lead terminal 13 are extracted outwardly from the peripheral section (thermally welded section) 18 on the pair of sides of the exterior body 10, which are opposed to each other.

Figure 6:
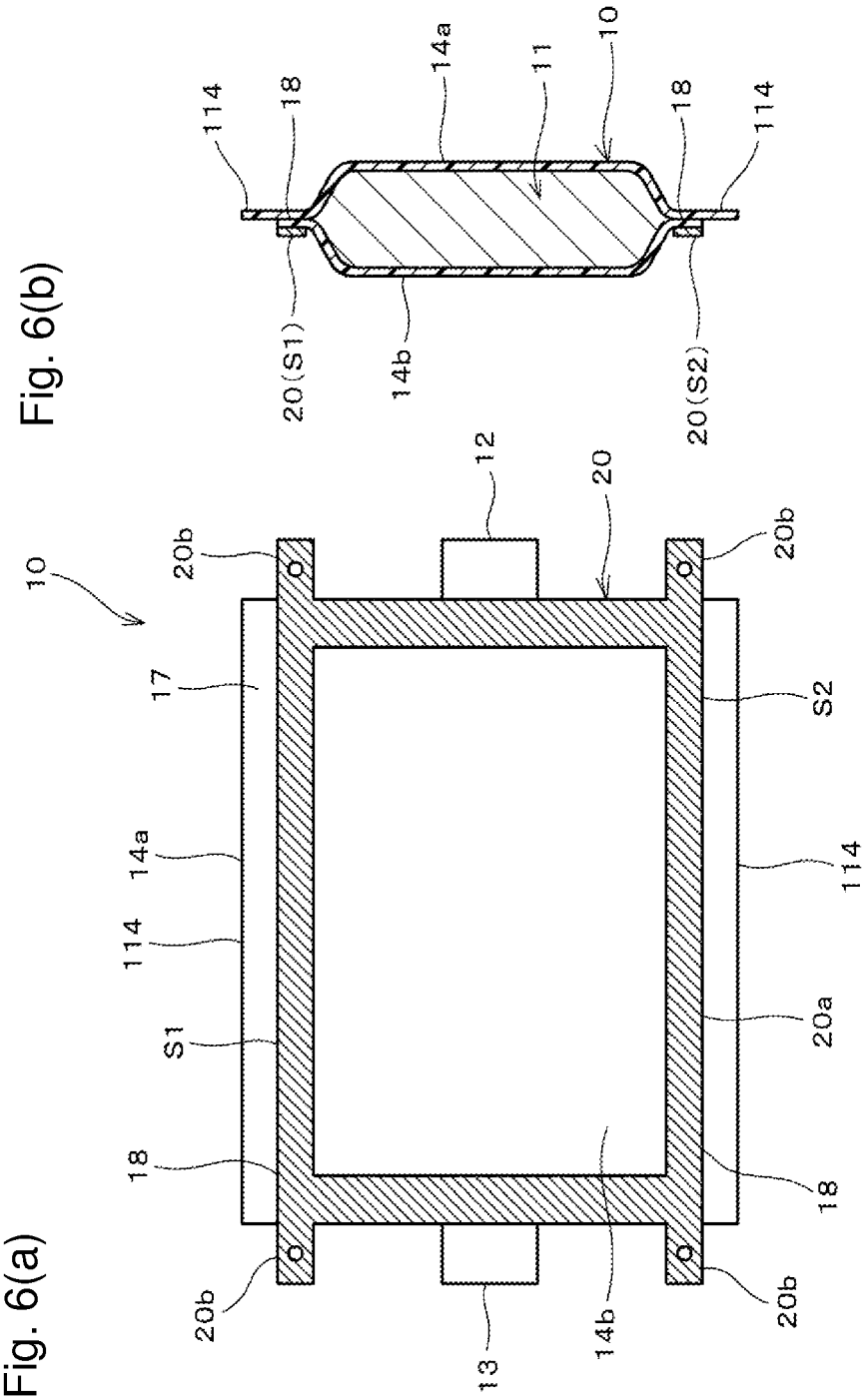
FIGS. 6(a) and 6(b) are diagrams illustrating a step of the method for manufacturing a battery according to Example 1 of the present invention, which are respectively a plan view and a sectional side view each illustrating a supporting member provided on the exterior body.

Then, as shown in FIGS. 6(*a*) and 6(*b*), the supporting member 20 is provided so that the opposed sides S1, S2 constituting the body-holding part 20*a* of the supporting member 20 are located on the peripheral section (thermally welded section) 18 on the pair of sides (the sides with the protruded parts 114 of the laminate sheet 14*a* formed) of the exterior body 10, which are orthogonal to the sides from which the positive electrode lead terminal 12 and the negative electrode lead terminal 13 are extracted.

Next, the protruded parts 114 of the laminate sheet 14*a* are entirely folded back so that the adhesive layers are located on the inside of the folded parts, and subjected to thermo-compression bonding to bond the adhesive layers of the folded parts to the opposed sides S1, S2 constituting the body-holding part 20*a* of the supporting member 20. Thus, the battery 1 is obtained, which is structured as shown in FIGS. 1 and 2.

In the thus manufactured battery 1, the sides S1, S2 constituting the body-holding part 20*a* of the supporting member 20 are bonded with the adhesive layer of the laminate sheet 14*a* of the pair of laminate sheets 14*a*, 14*b* constituting the exterior body 14, and held and fixed on the peripheral section (thermally welded section) 18 of the exterior body 14, thus making it possible to achieve a highly reliable battery with the supporting member 20 reliably bonded and fixed on the exterior body 14, without separately requiring any adhesive.

In addition, the supporting member 20 can ensure high fixing strength and shape maintenance strength, and the body-holding part 20*a* of the supporting member 20 holds and fixes the region A in contact with the exterior body for the region A with the battery element 11 housed therein, and thus, the highly reliable battery 1 can be achieved (FIG. 1).

Furthermore, the protruded parts 114 of the laminate sheet 14*a* are entirely folded back, and it is thus possible to make the planar shape and planar area of the exterior body 14 formed by the laminate sheet 14*a* and the other laminate sheet 14*b* equal in shape and size to the planar shape and planar area of an exterior body 14 formed in the absence of the protruded parts 114, without causing an increase in product size.

In addition, on the sides without the positive electrode lead terminal 12 or the negative electrode lead terminal 13 extracted therefrom, the body-holding part 20*a* of the supporting member 20 is adhesively fixed with the adhesive layer 17 of the laminate sheet 14*a* folded back, and a highly reliable battery can be thus achieved which is structured to have the body-holding part 20*a* of the supporting member 20 bonded to the peripheral section (thermally welded section) 18 of the exterior body 14, without decreasing the sealing reliability of the exterior body on the sides with the positive electrode lead terminal 12 negative electrode lead terminal 13 extracted therefrom.

In addition, the supporting member composed of the same polyethylene resin as the material constituting the adhesive layer 17 of the laminate sheet 14 is used as the supporting member 20 in the example described above, and the highly reliable battery 1 can be thus achieved which has the supporting member 20 adhesively fixed on the exterior body 14 in a reliable manner, and has the supporting member 20 increased in strength.

Figure 7:
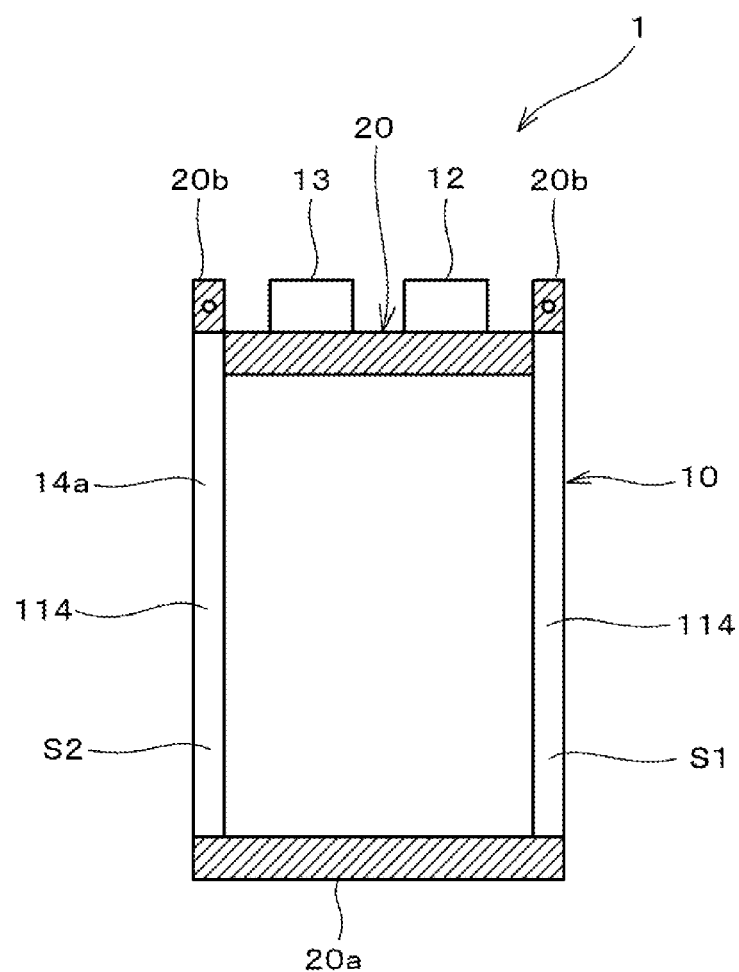
FIG. 7 is a diagram illustrating a modification example of a battery according to an example of the present invention.
Figure 8:
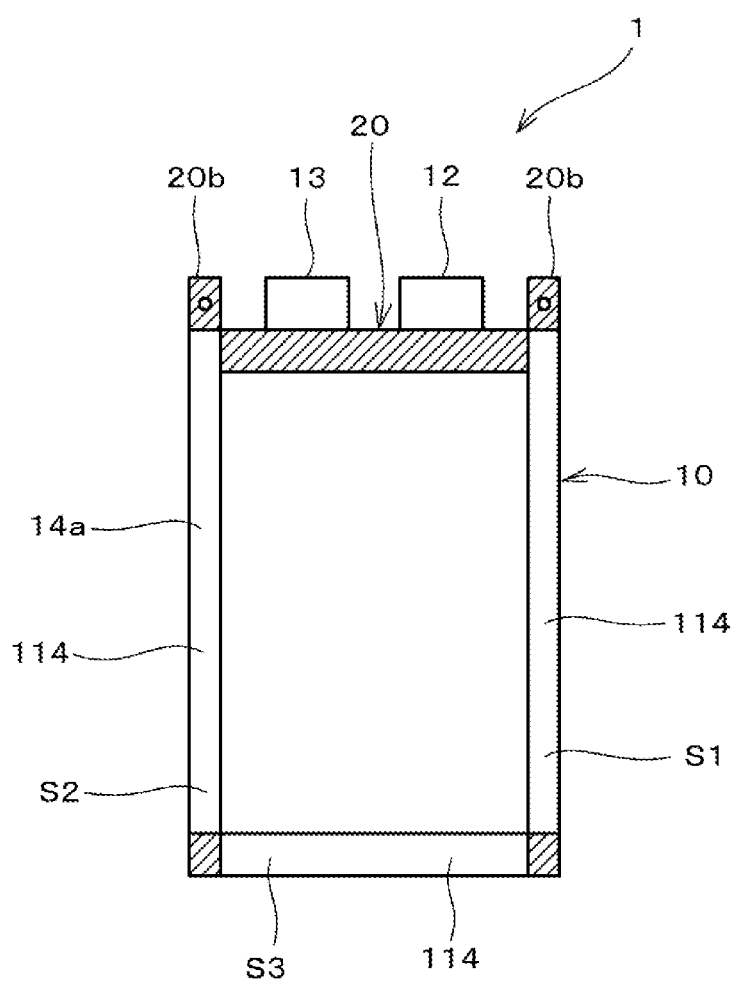
FIG. 8 is a diagram illustrating another modification example of a battery according to an example of the present invention.

It is to be noted that while the example has been described by taking, as an example, the battery structured to have the positive electrode lead terminal and negative electrode lead terminal extracted from the mutually opposed sides of the exterior body which is rectangular in planar shape, it is also possible to apply the invention to a battery 1 structured to have the positive electrode lead terminal 12 and negative electrode lead terminal 13 extracted from one side of the exterior body 14 as shown in FIGS. 7 and 8.

In the case of manufacturing the battery 1 structured as shown in FIG. 7, the protruded parts 114 of the laminate sheet 14*a* are formed on a pair of sides of the exterior body 14, orthogonal to the side with the positive electrode lead terminal 12 and negative electrode lead terminal 13 extracted therefrom, and the protruded parts 114 are folded back to bond the adhesive layers of the folded parts to the pair of opposed sides S1, S2 constituting the body-holding part 20*a* of the supporting member 20.

Thus, as shown in FIG. 7, the battery 1 is obtained which is structured to have the positive electrode lead terminal 12 and negative electrode lead terminal 13 extracted from one side of the exterior body 14, and have the pair of opposed sides S1, S2 of the body-holding part 20*a* held and fixed on the peripheral section (thermally welded section) 18 of the exterior body 14, on the two sides orthogonal to the side with the positive electrode lead terminal 12 and negative electrode lead terminal 13 extracted therefrom.

In addition, in the case of manufacturing the battery structured as shown in FIG. 8, the protruded parts 114 of the laminate sheet 14*a* are formed on a pair of sides of the exterior body 14, orthogonal to the side with the positive electrode lead terminal 12 and negative electrode lead terminal 13 extracted therefrom, and on one side opposed to the side with the positive electrode lead terminal 12 and negative electrode lead terminal 13 extracted therefrom, and the protruded parts 114 are folded back to bond the adhesive layers of the folded parts to the sides S1, S2, S3 constituting the body-holding part 20*a* of the supporting member 20.

Thus, as shown in FIG. 8, the battery 1 is obtained which is structured to have the positive electrode lead terminal 12 and negative electrode lead terminal 13 extracted from one side of the exterior body 14, and have the three opposed sides S1, S2, S3 constituting the body-holding part 20*a* held and fixed on the peripheral section (thermally welded section) 18 of the exterior body 14, on the two sides orthogonal to the side with the positive electrode lead terminal 12 and negative electrode lead terminal 13 extracted therefrom, and on the side opposed to the side with the positive electrode lead terminal 12 and negative electrode lead terminal 13 extracted therefrom.

In addition, while the example has been described by taking, as an example, a case of using, as the supporting member, a supporting member that is smaller in thickness than the total thickness (that is, the battery thickness) of the battery element and exterior body, the supporting member made larger in thickness than the total thickness of the battery element and exterior body can prevent the battery 1 from being damaged even by other member falling or approaching from above.

The present invention is not to be considered limited to the example described above in other respects, and various applications and modifications can be made without departing from the scope of the invention, regarding the specific shape and constituent material of the supporting member, the specific configuration of the laminate sheets constituting the exterior body, the type of the constituent material of the battery element, etc. For example, the laminated body with the positive electrode member and negative electrode member stacked to be opposed to each other with the separator interposed therebetween may be sheeted or wound. In addition, the laminate sheets are not limited to the pair of laminate sheets structured to have adhesive layers opposed to each other, and it is also possible to fold back one laminate sheet in a way that an inner adhesive layer thereof is structured to be opposed to itself.

DESCRIPTION OF REFERENCE SYMBOLS

1 battery (unit battery)
10 exterior body
11 battery element
12 positive electrode lead terminal
13 negative electrode lead terminal
14(14*a*, 14*b*) laminate sheet
15 outer protective layer (polyamide resin layer)
16 gas barrier layer (aluminum layer)
17 inner adhesive layer (polypropylene resin layer)
18 peripheral section (thermally welded section)
20 supporting member
20*a* body-holding part of supporting member
20*b* fixing part of supporting member
30 housing space
114 protruded part
"A" region with battery element housed therein
S1, S2, S3, S4 each side of body-holding part of supporting member

The invention claimed is:
1. A battery comprising:
a battery element including a laminated body having a positive electrode member and a negative electrode member stacked in opposed relation to each other with a separator interposed therebetween, and an electrolyte;
an exterior body housing the battery element, the exterior body including a pair of laminate sheets, a first of the pair of laminate sheets being larger than a second of the pair of laminate sheets, and each laminate sheet having a resin protective layer, a metallic intermediate gas barrier layer, and a resin adhesive layer;
a positive electrode lead terminal electrically connected to the positive electrode member and a negative electrode lead terminal electrically connected to the negative electrode member and extracted outward from the exterior body;
a supporting member including a fixing part that fixes the battery to a supporting member of a second battery, and a body-holding part configured to hold and fix a region of the exterior body with the battery element housed therein such that the region is held and fixed with the body-holding part in contact with the protective layer of the second laminate sheet at a peripheral section in the region of the exterior body,
the first of the pair of laminate sheets including a protruded part that protrudes from an opposed region of the first laminate sheet when the pair of first and second laminate sheets are opposed to each other, the protruded part being configured to be folded back so that the adhesive layer of the first laminate sheet is located on an inside of the folded part, and the adhesive layer of the first laminate sheet is bonded to the body-holding part of the supporting member to hold and fix the supporting member on the exterior body.

2. The battery according to claim 1, wherein at least the fixing part is configured to project outward from the exterior body.

3. The battery according to claim 1, wherein the exterior body is rectangular in planar shape, and the body-holding part of the supporting member is bonded to a peripheral section of the exterior body with the adhesive layer of the first laminate sheet folded back, on a side of the exterior body without the positive electrode lead terminal or the negative electrode lead terminal extracted therefrom.

4. The battery according to claim 1, wherein the supporting member is one of a resin material and a metal material.

5. The battery according to claim 1, wherein the positive electrode lead terminal and the negative electrode lead terminal are extracted outward from a same side of the exterior body.

6. The battery according to claim 1, wherein the positive electrode lead terminal and the negative electrode lead terminal are extracted outward from different sides of the exterior body.

7. An assembled battery comprising at least two batteries according to claim 1, wherein the fixing parts of the supporting members of each of the batteries are linked together to integrate the batteries.

* * * * *